(12) United States Patent
Li

(10) Patent No.: US 9,846,419 B2
(45) Date of Patent: Dec. 19, 2017

(54) METHOD OF TERMINAL FOR CONTROLLING INTELLIGENT HOUSEHOLD APPLIANCES AND INTELLIGENT SOCKET

(71) Applicant: SHENZHEN GALAXYWIND NETWORK SYSTEMS CO., LTD., Shenzhen (CN)

(72) Inventor: Zemin Li, Shenzhen (CN)

(73) Assignee: Shenzhen Galaxywind Network Systems Co., Ltd., Shenzhen (CN)

( * ) Notice: Subject to any disclaimer, the term of this patent is extended or adjusted under 35 U.S.C. 154(b) by 224 days.

(21) Appl. No.: 14/777,447

(22) PCT Filed: Feb. 15, 2015

(86) PCT No.: PCT/CN2015/073125
§ 371 (c)(1),
(2) Date: Sep. 15, 2015

(87) PCT Pub. No.: WO2016/011808
PCT Pub. Date: Jan. 28, 2016

(65) Prior Publication Data
US 2016/0202674 A1 Jul. 14, 2016

(30) Foreign Application Priority Data
Jul. 22, 2014 (CN) .......................... 2014 1 0348090

(51) Int. Cl.
*G05B 15/02* (2006.01)
*H04L 12/28* (2006.01)
(Continued)

(52) U.S. Cl.
CPC ........... *G05B 15/02* (2013.01); *G05B 19/418* (2013.01); *G08C 17/02* (2013.01); *G08C 23/04* (2013.01);
(Continued)

(58) Field of Classification Search
CPC ... G05B 15/02; G05B 19/418; H04L 12/2816; G08C 17/02; G08C 23/04; H01R 13/66
See application file for complete search history.

(56) References Cited

U.S. PATENT DOCUMENTS 6,218,931 B1 * 4/2001 Asghar .................. H04B 1/707
340/12.33
6,993,417 B2 * 1/2006 Osann, Jr. .............. G05B 15/02
340/635

(Continued)

FOREIGN PATENT DOCUMENTS

| CN | 202940400 | 5/2013 |
| CN | 103176445 | 6/2013 |

(Continued)

OTHER PUBLICATIONS

ISR for PCT/CN2015/073125 filed on Feb. 15, 2015.

*Primary Examiner* — Ramesh Patel
(74) *Attorney, Agent, or Firm* — Schmeiser, Olsen & Watts LLP

(57) ABSTRACT

A method for controlling intelligent household appliances, comprising: acquiring an appliance control signal set and an initialization feedback signal set corresponding to the control signal set, and sending a control signal; receiving the control signal, sending the control signal to the household appliance to instruct the household appliance to perform an operation represented by the control signal; acquiring state information and a feedback signal of the household appliance; and calculating a variation amount of the state information, and judging a matching rate between the feedback signal and the initialization feedback signal The present invention also provides an intelligent socket, which can allow a terminal to obtain an actual control result after a control instruction being sent An intelligent socket based on a high power infrared emitting tube, wherein the high power (Continued)

infrared emitting tube is provided in a limiting hole for infrared emission in a direction away from a panel.

13 Claims, 3 Drawing Sheets

(51) Int. Cl.
    *G05B 19/418*     (2006.01)
    *G08C 17/02*     (2006.01)
    *G08C 23/04*     (2006.01)
    *H01R 13/66*     (2006.01)

(52) U.S. Cl.
    CPC ......... *H01R 13/66* (2013.01); *H04L 12/2816* (2013.01)

(56) References Cited

U.S. PATENT DOCUMENTS

| | | | | |
|---|---|---|---|---|
| 8,242,640 | B2* | 8/2012 | Lee | H01R 13/665 307/117 |
| 9,063,551 | B2* | 6/2015 | Deivasigamani | G05D 7/0629 |
| 9,325,516 | B2* | 4/2016 | Pera | H04L 12/2803 |
| 9,685,992 | B2* | 6/2017 | Bennett | H04B 3/54 |
| 2001/0025349 | A1* | 9/2001 | Sharood | G06Q 30/0235 713/340 |
| 2003/0050737 | A1* | 3/2003 | Osann, Jr. | G05B 15/02 700/276 |
| 2004/0002792 | A1* | 1/2004 | Hoffknecht | G05B 15/02 700/295 |
| 2006/0152379 | A1* | 7/2006 | Lewis | H02H 3/04 340/679 |
| 2008/0183316 | A1* | 7/2008 | Clayton | G05B 19/042 700/90 |
| 2011/0095608 | A1* | 4/2011 | Jonsson | G01D 4/002 307/39 |
| 2013/0268125 | A1* | 10/2013 | Matsuoka | G05D 23/1905 700/276 |
| 2014/0098247 | A1* | 4/2014 | Rao | H04W 4/20 348/207.1 |
| 2014/0244044 | A1* | 8/2014 | Davis | H05B 37/0272 700/276 |
| 2014/0316581 | A1* | 10/2014 | Fadell | F24F 11/0009 700/276 |

FOREIGN PATENT DOCUMENTS

| | | |
|---|---|---|
| CN | 103401102 | 11/2013 |
| CN | 203553538 | 4/2014 |

* cited by examiner

METHOD OF TERMINAL FOR CONTROLLING INTELLIGENT HOUSEHOLD APPLIANCES AND INTELLIGENT SOCKET

TECHNICAL FIELD

The present invention relates to the technical field of control devices of household appliances, and specifically, to a method of a terminal for controlling intelligent household appliances and an intelligent socket.

BACKGROUND ART

Existing intelligent household appliances can be controlled through a user's terminal, for example, a mobile phone can control working states of intelligent household appliances by way of SMS (short message service), the Internet, the Internet of Things and etc. The control of household appliances is usually achieved through infrared ray, that is, an infrared ray receiver is provided inside a household appliance to receive a control signal from an infrared ray remote controller, so that the household appliance performs a corresponding action. After receiving the control signal, the household appliance generates a feedback signal, which is usually a sound signal. For example, when turning on or turning off an air conditioner or adjusting temperature or working state of the air conditioner, the air conditioner would produce a sound of beep from the internal. Different air conditioners have feedback sounds with specific features depending on different internal designs.

Since remote control may have a failure of signal transmission or infrared emitting devices have performances with high uncertainty due to different performances of them, the control may malfunction. Existing remote control methods for household appliances and air conditioners cannot judge whether the air conditioners or household appliances have received the control signal or whether they have performed corresponding actions after receiving the control signal; and a remote terminal cannot judge result after a control instruction has been issued.

In existing intelligent sockets, the infrared emitter is provided on the front face to cooperate with the infrared receiver of household appliances, but the intelligent sockets are restricted to a socket on a wall for a household appliance and by the uncertainty of the installation position of the household appliance. For example, the socket for an air conditioner and an indoor unit of the air conditioner are in the uncertain relatively positional relationship, with the large relative angle therebetween, and usually the socket for the air condition is located at one side of the indoor unit of the air conditioner. In this case, the air conditioner cannot be controlled with an intelligent socket using a common infrared emitting controlling method. Currently, a solution of an infrared extended line can be used, that is, a user additionally buys an infrared extended line through which the intelligent socket is connected with the indoor unit of the air conditioner, while this method is neither convenient nor elegant.

To overcome the above defects in the prior art, the present invention puts forward an improved technical solution as below.

DISCLOSURE OF THE INVENTION

The present invention aims to provide a method of a terminal for controlling intelligent household appliances and an intelligent socket, which can allow the terminal to obtain an actual control result after sending a control instruction and then achieve intelligent control on household appliances.

One embodiment of the present invention provides a method of a terminal for controlling intelligent household appliances, comprising:

acquiring a household-appliance control signal set and an initialization feedback signal set corresponding to the control signal set, and sending a control signal;

receiving a control signal sent by a terminal, sending the control signal to a household appliance to instruct the household appliance to perform an operation represented by the control signal; and acquiring state information and a feedback signal of the household appliances; and calculating a variation amount of the state information, judging a matching rate between the feedback signal and the initialization feedback signal represented by the control signal, and determining a current working state of the household appliance, wherein if the variation amount of the state information is greater than a threshold value and the feedback signal successfully matches the initialization feedback signal, then feedback information is sent to the terminal; and if the variation amount of the state information is lower than the threshold value or the feedback signal does not successfully match the initialization feedback signal, then the control signal is re-sent to the household appliance.

Another embodiment of the present invention provides an intelligent socket cooperating with a terminal already acquiring a household appliance control signal set and an initialization feedback signal set corresponding to the control signal set, which is used for remote control on household appliances, comprising: a signal acquiring module for acquiring state information and the feedback signal of the household appliance and sending acquired signal to a controller;

a controller for receiving the control signal from the terminal, sending the control signal to the household appliance, and instructing the household appliance to perform an operation represented by the control signal; calculating a variation amount of the state information, and judging a matching rate between the feedback signal and the initialization feedback signal represented by the control signal, wherein if the variation amount of the state information is greater than a threshold value and the feedback signal successfully matches the initialization feedback signal, feedback information is sent to the terminal; and if the variation amount of the state information is lower than the threshold value or the feedback signal does not successfully match the initialization feedback signal, the control signal is re-sent to the household appliance.

In addition, the embodiments of the present invention further provide an intelligent socket based on a high power infrared emitting tube, and the intelligent socket comprises an outer housing which comprises a receiving chamber and a panel encapsulating the receiving chamber, wherein the receiving chamber comprises a receiving cavity and a back plate connected as one piece, the panel is snapped onto the front face of the back plate, and the back plate is provided with limiting holes in its back face; the receiving cavity has a side wall provided with a receptacle slot and a rear end portion where an electric plug is fixed, characterized in that the intelligent socket further comprises:

a high power infrared emitting tube, mounted in the limiting hole for infrared emission in a direction away from the panel;

a programmable processor, configured for receiving acquired sound and infrared signal, voltage sampling and current sampling, and outputting processing information;

a sound acquiring module, configured for acquiring a sound signal in a space where the socket is located, and sending the signal to the programmable processor;

an infrared receiving module, configured for acquiring a infrared signal in the space where the socket is located, and sending the signal to the programmable processor;

a Wi-Fi module, configured for receiving the processing signal of the programmable processor and sending a processing result signal to a terminal through a network; and receiving an instruction of controlling a household appliance sent from a user receiving terminal and transferring it to the programmable processor;

a current voltage acquiring module, configured for measuring magnitude of a voltage and electric current provided to the household appliance through this socket, and sending a signal to the programmable processor to judge current working state of the household appliance; and a light sensor, configured for acquiring light brightness of current environment and sending a signal to the programmable processor to control the household appliance in combination with a user's use habits and the current state of the household appliance.

In view of the above, the present invention has following advantages.

The method and the intelligent socket provided by the embodiments of the present invention can remotely receive the control instruction from the terminal, and meanwhile can allow the terminal to obtain an actual control result after sending the control instruction, so as to achieve intelligent control on the household appliance.

The high power infrared emitting tube of the embodiments of the present invention is provided in the limiting hole, and its infrared emission is in the direction away from the panel, so that when the socket is provided on a wall, a infrared ray undergoes diffuse reflection on the wall and furniture, wherein since the socket of the household appliances is near the position where the household appliance is installed, the diffuse reflection forms numerous infrared receiving points around the household appliance, and the control signal sent from the intelligent socket can be easily received by the infrared receiving device of the household appliance, and a processing result of the programmable processor can be by way of a Wi-Fi module sent to the user terminal in real time, so as to allow the user to know actual working state of the household appliance.

DETAILED DESCRIPTION OF EMBODIMENTS

Figure 1:
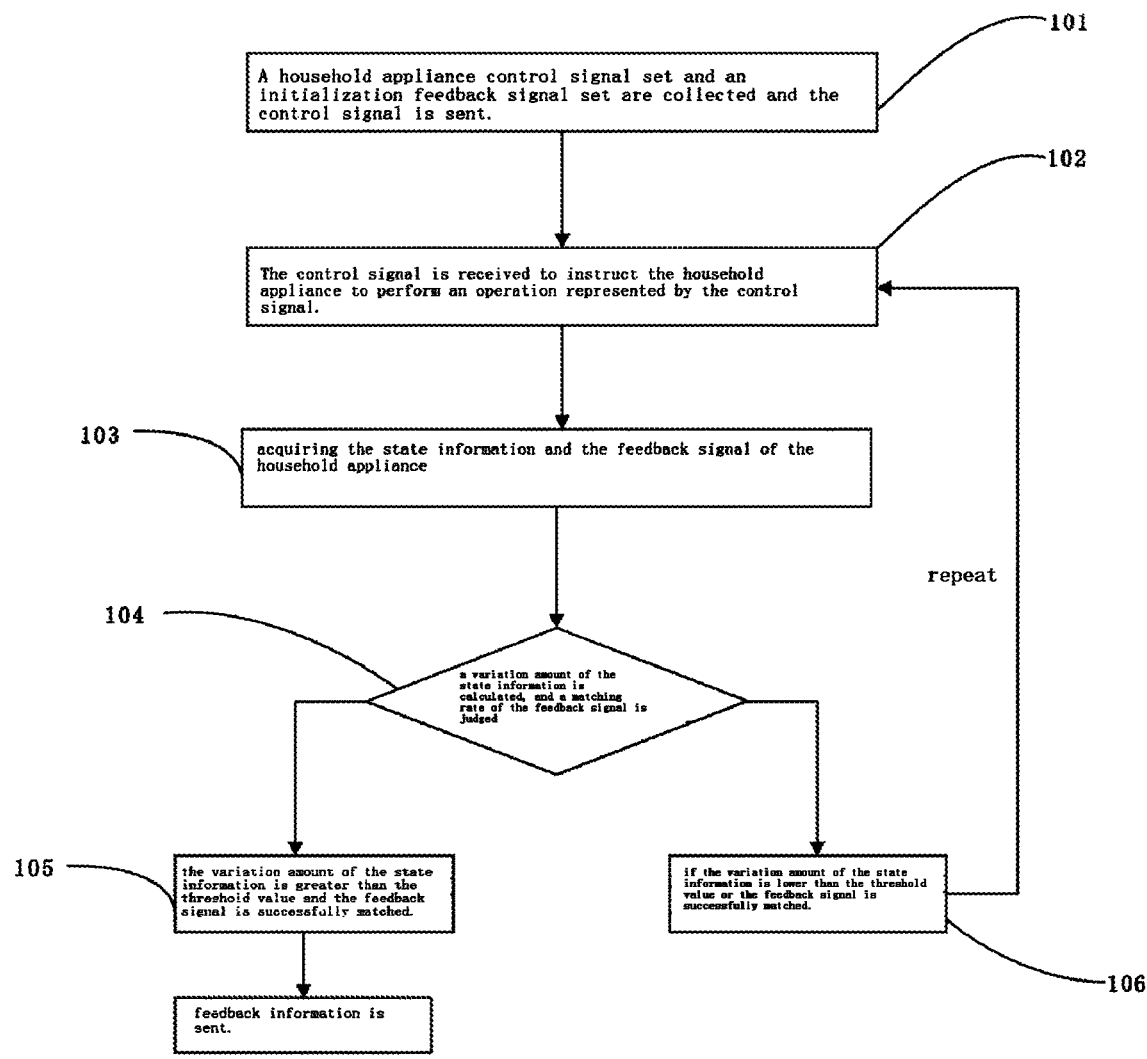
FIG. 1 is a flow chart according to an embodiment of the present invention, showing that the terminal controls the intelligent household appliance.

Referring to FIG. 1, one embodiment of the present invention provides a method of a terminal for controlling intelligent household appliances, and the method comprises:

Step 101, in which a household appliance control signal set and an initialization feedback signal set corresponding to the control signal set are collected, and the control signal is sent, wherein the household appliance control signal set comprises a control content set of a household appliance, for example, a signal of controlling turn-on and turn-off of the household appliance, a signal of controlling temperature increase and temperature decrease of the household appliance and an air conditioner, a signal of controlling the household appliance to stay in standby or work in different stages and etc., the household appliance control signal set can be adjusted adaptively according to type of the household appliance, for example, the control signal set of the air conditioner can comprise a switch signal, temperature increase and decrease signals, working time setting signal and etc., the household appliance will generate a feedback signal after receiving a remote control signal, and the feedback signal usually is a sound of buzz, the household appliance may generate different sounds of buzz, which can be differentiated easily, or the sounds can be the same, when different control signals are inputted, while usually a feedback signal will be generated, therefore, the feedback signals correspond to the inputted control signals one by one.

Step 102, in which the control signal is received and is sent to the household appliance to instruct the household appliance to perform an operation represented by the control signal, wherein the control signal can be received through a wireless network or wired network, the received control signal is, after being identified, transferred to the household appliance, wherein the control signal can be delivered to an infrared ray receiver of the household appliance through a common infrared ray control manner;

Step 103, in which after receiving the control signal, the household appliance will perform a corresponding action in normal situation, wherein when the corresponding action is performed, the information reflecting the working state of the household appliance will change, and meanwhile a feedback signal will be sent timely, which is herein used to acquiring the state information and the feedback signal of the household appliance;

Step 104, in which a variation amount of the state information is calculated, and a matching rate between the feedback signal and the initialization feedback signal represented by the control signal is judged, wherein after the control signal is sent, the household appliance may perform a corresponding operation or may not perform the corresponding operation for various reasons, and when the household appliance is performing the corresponding operation, the internal state signal will change, and it can be judged whether the household appliance has performed the corresponding operation by comparing the state information of the household appliance before and after the control signal being sent, meanwhile, it can be judged whether the household appliance has performed the corresponding operation, through acquiring the feedback signal around the household appliance after sending the control signal and comparing the feedback signal with the initialization feedback signal corresponding to the control signal, and it can be known from the working principle of household appliances that if the household appliance has not performed the corresponding operation, any feedback signal contained in the initialization feedback signal set will not be generated;

Step 105, since signal detection has a certain error, a threshold value is preset, wherein when the variation amount of the state information is greater than the threshold value and the feedback signal successfully matches the initialization feedback signal, it indicates that the household appliance has performed the instruction of the control signal, and at this moment, feedback information is sent to the terminal; it is prompted that the operation succeeds;

the matching between the feedback signal and the initialization feedback signal can be in such a way that an audio signal fed back contains an initialization feedback audio signal, the terminal can be a mobile terminal or a fixed computer terminal, the feedback information sent to the terminal can comprise text information, sound information or image information, it is displayed and reminded through a display interface or voice that the control on the household appliance succeeds;

Step 106, in which if the variation amount of the state information is lower than the threshold value or the feedback signal does not successfully match the initialization feedback signal, then when either of the two conditions is met, it is indicated that the household appliance has not performed the control instruction, and the operation fails. At this moment, the initial control signal is re-sent to the household appliance, until the operation succeeds. In this course, a hint indicating that the operation fails can be sent to the terminal periodically.

In one embodiment of the present invention, in Step 103, the state information and the feedback signal of the household appliance need to be acquired. Usually, a household appliance, when operating in different states, has parameters mainly comprising current, voltage and phase, that is, the current, voltage and phase of a household appliance during different working states are different. Therefore, in this embodiment, it is preferable that the acquired state information includes the information about current, voltage and phase, and the acquired feedback signal is an audio signal.

Figure 2:
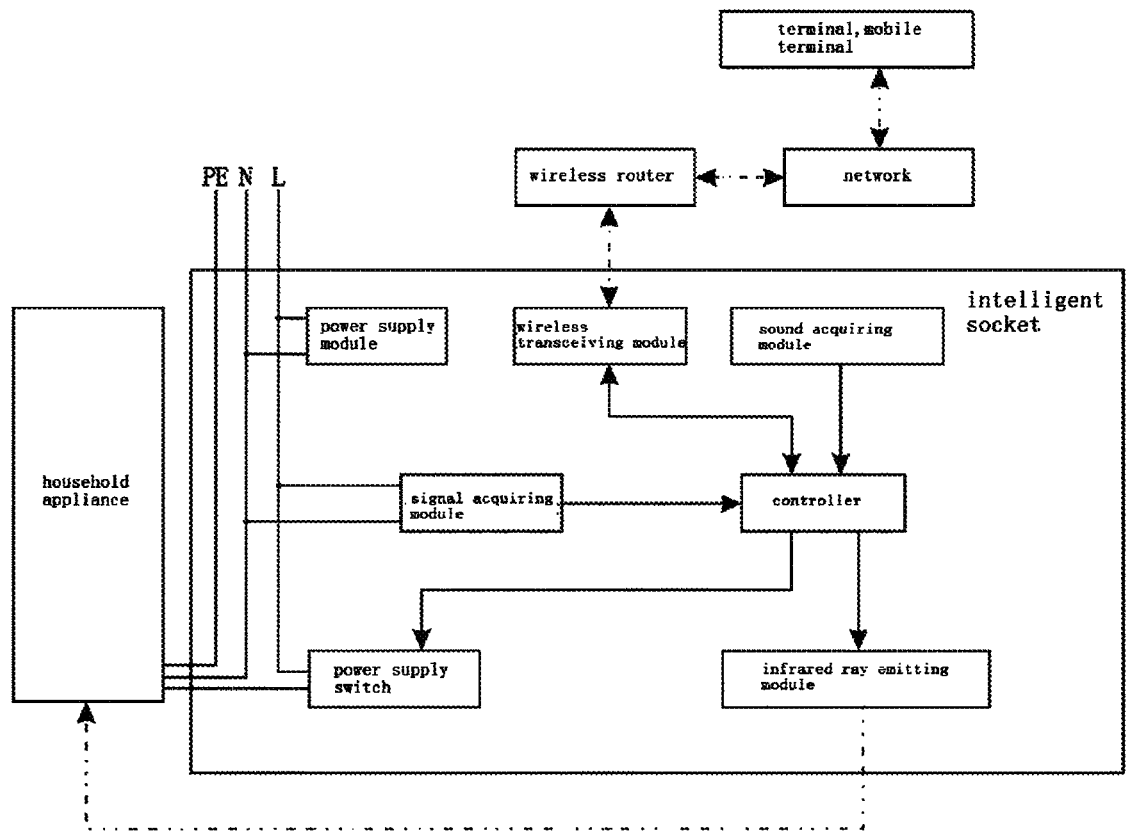
FIG. 2 is a structural block diagram of the intelligent socket according to the embodiment of the present invention.

Referring to FIG. 2, one embodiment of the present invention provides an intelligent socket, which uses the above method to remotely control a household appliance. The intelligent socket comprises:

a signal acquiring module, configured for acquiring state information and a feedback signal of a household appliance, and sending the acquired signal to a controller;

a controller, configured for receiving a control signal from a terminal through a network, sending the control signal to the household appliance, and instructing the household appliance to perform an operation represented by the control signal; calculating a variation amount of the state information of the household appliance after sending the instruction of the control signal, and judging a matching rate between the feedback signal and an initialization feedback signal represented by the control signal.

If the variation amount of the state information is greater than a threshold value and the feedback signal successfully matches the initialization feedback signal, then feedback information is sent to the terminal; and if the variation amount of the state information is lower than the threshold value or the feedback signal does not successfully match the initialization feedback signal, the control signal is re-sent to the household appliance. The controller can also be connected with a power supply switch, and the power supply switch can switch off or on the household appliance. The controller can receive the control signal from the terminal and controls the on/off state of the power supply switch.

The intelligent socket can be provided with an infrared ray emitting module which receives the signal from the controller and sends the received control signal to the infrared ray receiving module of the household appliance.

The terminal is connected with the controller through a wireless network module which comprises a wireless transceiving module and a wireless router. The signal acquiring module comprises a current voltage sensor, a phase sensor and a sound acquiring and identifying module. The sound acquiring and identifying module acquires sound signals around the household appliance, and extracts through a specific algorithm a feedback signal and a feature of a prompt sound, with the feedback signal sent by the household appliance when being controlled, and the feedback signal and the feature of the prompt sound are subjected to a feature matching with the feedback signal and the prompt sound acquired during a system initialization. The feedback signal is transmitted to the controller, and when controlling a household appliance through the infrared ray emitting module, the controller uses the feedback signal to judge whether the infrared signal has been received by an air conditioner and taken effect.

Figure 3:
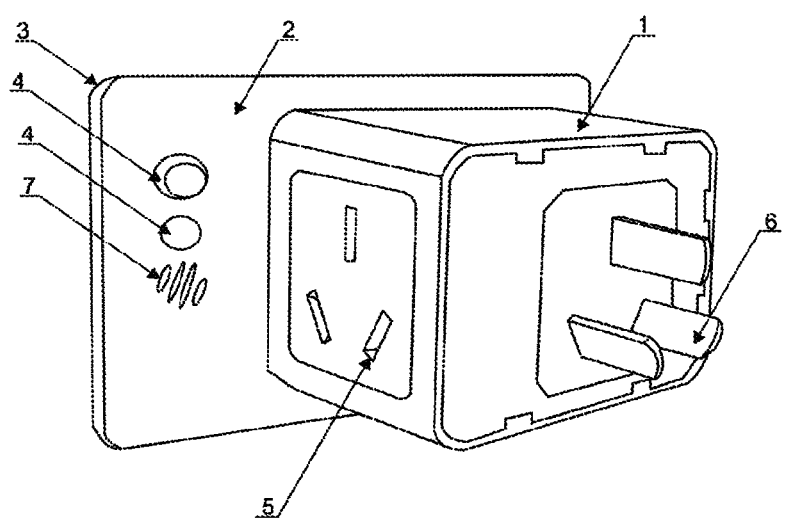
FIG. 3 is a structural schematic diagram of the intelligent socket according to the embodiment of the present invention.
Figure 4:
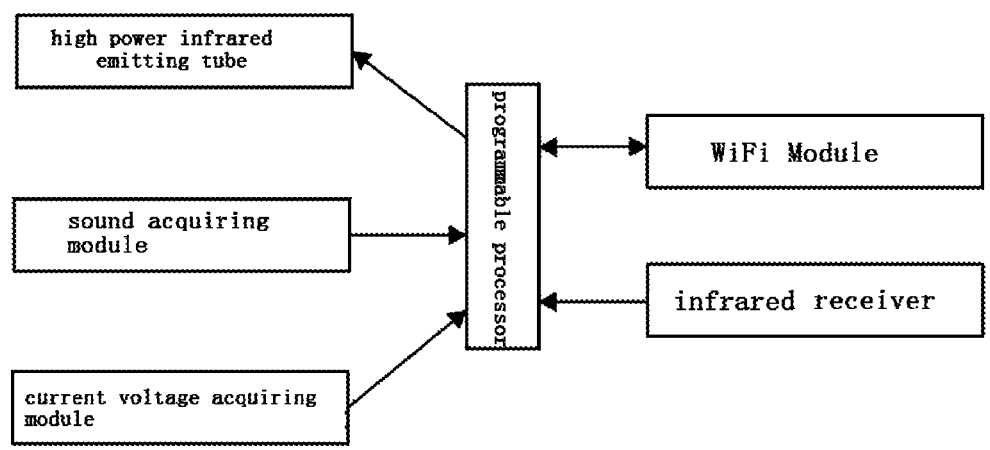
FIG. 4 is a block diagram of internal modules of the intelligent socket according to the embodiment of the present invention.

Referring to FIGS. 3 and 4, another embodiment of the present invention provides an intelligent socket based on a high power infrared emitting tube, and the intelligent socket comprises an outer housing which consists of a receiving chamber and a panel encapsulating the receiving chamber, wherein the receiving chamber consists of a receiving cavity 1 and a back plate 2 connected as one piece, the panel 3 is snapped at the front face of the back plate 2, and the back face of the back plate 2 is provided with limiting holes 4; the receiving cavity 1 has a side wall provided with an receptacle slot 5 and a rear end portion where an electric plug 6 is fixed. The electric plug 6 can be inserted into a socket on a wall to provide power for all modules in the receiving chamber, and at the same time, it is in electrical connection with an insert (tablet) in a receptacle slot 5, and the plug of the household appliance is inserted into the receptacle slot 5 to be connected with the insert, for energization.

The receiving chamber is provided therein with a high power infrared emitting tube, a sound acquiring module, an infrared receiver, a Wi-Fi module, a current voltage acquiring module, a programmable processor and a light sensor, wherein the high power infrared emitting tube is mounted in the limiting hole for infrared emission in a direction away from the panel; that is, the high power infrared emitting tube can be mounted in the way that the emitting end thereof is inserted into the limiting hole 4 and the other part in electrical connection with the other modules is mounted in the receiving chamber.

The infrared receiver is used to receive an infrared remote control signal sent by a remote controller and send the signal to a programmable processor. The sound acquiring module is used to acquire a sound signal in a space where the socket is located and send the signal to the programmable processor. The Wi-Fi module is used to receive a processing signal of the programmable processor and send a processing result signal to a (mobile) terminal through the network; and receive an instruction of controlling household appliances sent from the (mobile) terminal. The current voltage acquiring module is used to acquire power information of the household appliance, that is, the magnitude of the current and voltage which the socket provides to the household appliance. The high power infrared emitting tube is used to send the processing signal of the programmable processor to the infrared receiving device of the household appliance. The programmable processor is used to receive the acquired sound and an infrared signal and output processing information. The light sensor (not shown in the drawings) is used to acquire light brightness of current environment and send a signal to the programmable processor to control the household appliance in combination with the user's use habits and the current state of the household appliance.

As a further optimization of the present invention, the power of the high power infrared emitting tube can be selected as 1 w-5 w. The back plate is provided with two limiting holes, and the sound acquiring module is fixed in one of the limiting holes.

As a further optimization of the present invention, an air vent may be provided in the receiving chamber. A temperature sensor is provided in the receiving cavity and is arranged near the air vent, and the temperature sensor sends a temperature sensing signal to the programmable processor.

The working principle or course of the above intelligent socket is as follow:

The intelligent socket as shown in FIG. 3 consists of a high power LED infrared emitting tube, a high sensitivity infrared receiving head, a Wi-Fi wireless transceiving module, a programmable controller and etc. Due to using the high power LED infrared emitting tube, the emitting tube can be arranged on the back face of the intelligent socket rather than the front face, which helps significantly improve the aesthetics of the product.

The intelligent socket can be connected to a household wireless router through a Wi-Fi module and then to a corresponding mobile phone App client through the Internet. A user sends a control instruction through the mobile phone App client. After the instruction reaches the intelligent socket through the Internet, the intelligent socket sends out the control instruction through its high power LED infrared emitting tube. Due to the principle of diffuse reflection, such infrared ray reaches the controlled household appliance after reflected by a wall, furniture and etc. For example, the infrared receiving head of the indoor unit of the air conditioner will be correctly decoded, then the household appliance performs a related action, and then one remote operation is completed.

If the user uses a common infrared remote controller to make one operation to the household appliance in the house, such infrared instruction is also captured by the infrared receiving head in the intelligent socket at the same time and then decoded, the intelligent socket sends in real time the content of this operation instruction to the remote mobile phone App client, and then the remote mobile phone App client can accurately sense the current working state of the household appliance.

The current voltage acquiring module can measure magnitude of the current and voltage this socket provides to the household appliance, and then can obtain the working state of the household appliances, for example, whether the air conditioner is currently turned off, supplying air, refrigerating or heating, such that after being processed and judged by the programmable processor, the actual state of the household appliances is sent to the terminal through the Wi-Fi module.

The sound acquiring module can acquire the sound information in the space where the household appliance is located, and is mainly used to acquire information about whether the household appliance has given out a corresponding sound after receiving the control signal. For example, the air conditioner usually beeps after receiving the signal. After acquiring the signal, the sound acquiring module sends it to the programmable processor so that the user side can obtain the control state of the household appliance.

The light sensor (not show in the drawing) is used to acquire the light brightness of current environment and send a signal to the programmable processor to control the household appliance in combination with the user's use habits and the current state of the household appliance. For example, when the socket of an intelligent air conditioner detects the environment light is dim, the air conditioner is intelligently adjusted to a sleep mode, which makes the user feel intelligent and comfortable.

Described above are just preferred embodiments of the present invention, which are not intended to restrict the present invention. For those skilled in the art, the present invention may have various modifications and changes. Any modifications, equivalent substitutions, improvements and etc. within the spirits and principles of the present invention shall be contained within the scope of protection of the present invention.

The invention claimed is:

1. A method of a terminal for controlling intelligent household appliances, comprising:
    acquiring a household appliance control signal set and an initialization feedback signal set corresponding to the control signal set, and sending a control signal;
    receiving the control signal from the terminal, sending the control signal to a high power LED infrared emitting module;
    sending a high power infrared ray comprising the control signal from the high power LED infrared emitting module to a household appliance, and instructing the household appliance to perform an operation represented by the control signal;
    acquiring state information and a feedback signal of the household appliance; and
    calculating a variation amount of the state information, and judging a matching rate between the feedback signal and the initialization feedback signal represented by the control signal,
    wherein if the variation amount of the state information is greater than a threshold value and the feedback signal successfully matches the initialization feedback signal, feedback information is sent to the terminal; and
    if the variation amount of the state information is lower than the threshold value or the feedback signal does not successfully match the initialization feedback signal, the control signal is re-sent to the household appliance.

2. The method according to claim 1, wherein the state information comprises current information, voltage information and phase information.

3. The method according to claim 1, wherein the feedback signal set includes audio signals and the feedback signal in audio signal type.

4. An intelligent socket cooperating with a terminal which has already acquired a household appliance control signal set and an initialization feedback signal set corresponding to the control signal set, the intelligent socket used for remote control on a household appliance, comprising:
    a signal acquiring module, configured for acquiring state information and a feedback signal of the household appliance and sending the acquired signal to a controller;
    a high power LED infrared emitting tube;
    the controller, configured for receiving a control signal from the terminal, sending an infrared ray generated by the high power LED infrared emitting tube comprising the control signal to the household appliance to instruct the household appliance to perform an operation represented by the control signal; calculating a variation amount of the state information, and judging a matching rate between the feedback signal and the initialization feedback signal represented by the control signal, wherein if the variation amount of the state information is greater than a threshold value and the feedback signal successfully matches the initialization feedback signal, feedback information is sent to the terminal; and if the variation amount of the state information is lower than the threshold value or the feedback signal does not successfully match the initialization feedback signal, the control signal is re-sent to the household appliances.

5. The intelligent socket according to claim 4, wherein the signal acquiring module comprises a current voltage sensor, a phase sensor and a sound acquiring and identifying module.

6. The intelligent socket according to claim 4, wherein the terminal is connected with the controller via a wireless network module, which comprises a wireless transceiving module and a wireless router.

7. The intelligent socket according to claim 4, further comprising a power supply switch connected with the controller.

8. An intelligent socket comprising an outer housing, which comprises a receiving chamber and a panel encapsulating the receiving chamber, wherein the receiving chamber comprises a receiving cavity and a back plate connected as one piece, the panel is snapped onto the front face of the back plate, and a back face of the back plate is provided with limiting holes; the receiving cavity has a side wall provided with a receptacle slot and a rear end portion where an electric plug is fixed, wherein the intelligent socket further comprises:
 a high power infrared emitting tube, provided in one of the limiting holes for infrared emission in a direction away from the panel;
 a programmable processor, configured for receiving current, voltage, sound and infrared signals which are acquired, and outputting processing information;
 a sound acquiring module, configured for acquiring a sound signal in a space where the socket is located, and sending the sound signal to the programmable processor;
 an infrared receiving module, configured for acquiring an infrared signal in the space where the socket is located, and sending the infrared signal to the programmable processor;
 a Wi-Fi module, configured for receiving a processing signal from the programmable processor and sending a processing result signal to the terminal via a network;
 a current voltage acquiring module, configured for measuring magnitude of voltage and current provided to the household appliance through this socket, and sending a signal to the programmable processor to judge an actual working state of the household appliance; and
 a light sensor, configured for acquiring light brightness of current environment and sending a signal to the programmable processor to control the household appliance in combination with an user's use habits and the actual state of the household appliance.

9. The intelligent socket according to claim 8, wherein power of the high power infrared emitting tube is 1 w-5 w.

10. The intelligent socket according to claim 8, wherein the back plate is provided with two limiting holes, and the sound acquiring module is fixed in one of the limiting holes.

11. The intelligent socket according to claim 8, wherein an air vent is provided in the receiving chamber.

12. The intelligent socket according to claim 8, wherein a temperature sensor is provided in the receiving cavity and is provided near the air vent, and the temperature sensor sends a temperature sensing signal to the programmable processor.

13. The intelligent socket according to claim 11, wherein a temperature sensor is provided in the receiving cavity and is provided near the air vent, and the temperature sensor sends a temperature sensing signal to the programmable processor.

* * * * *